United States Patent [19]

Shigemori et al.

[11] 3,914,579

[45] Oct. 21, 1975

[54] AUTOMATIC MONEY DISPENSER

[75] Inventors: Hideto Shigemori; Akio Ueba; Motoaki Fukunaga; Hisashi Kitakami; Takayoshi Yamashita, all of Himeji, Japan

[73] Assignee: Glory Kogyo Kabushiki Kaisha, Japan

[22] Filed: Dec. 18, 1973

[21] Appl. No.: 425,828

[30] Foreign Application Priority Data

Dec. 21, 1972 Japan.............................. 47-127693
Dec. 21, 1972 Japan.............................. 47-127695
Dec. 23, 1972 Japan................................ 47-2259

[52] U.S. Cl. ........ 235/61.7 B; 221/6; 194/DIG. 9 B; 235/61.8 R
[51] Int. Cl.² ... G07F 7/04; G07F 7/08; G06K 5/00; G07F 9/02
[58] Field of Search ................ 221/6; 194/DIG. 9 B; 235/61.11 R, 61.7 B, 61.6 R, 61.8 R; 340/149 A

[56] References Cited
UNITED STATES PATENTS

| | | | |
|---|---|---|---|
| 2,776,035 | 1/1957 | Hebel..................................... | 221/6 |
| 3,173,530 | 3/1965 | Lord ...................................... | 221/6 |
| 3,260,402 | 7/1966 | Lareau................................... | 221/6 |
| 3,560,715 | 2/1971 | Akamatsu ...................... | 235/61.8 R |
| 3,673,571 | 6/1972 | Constable....................... | 235/61.7 B |
| 3,675,816 | 7/1972 | Bourke....................... | 194/DIG. 9 B |
| 3,760,158 | 9/1973 | Whitehead..................... | 235/61.6 R |
| 3,784,790 | 1/1974 | Hatanaka..................... | 194/DIG. 9 B |
| 3,805,937 | 4/1974 | Hatanaka..................... | 194/DIG. 9 B |

*Primary Examiner*—Daryl W. Cook
*Assistant Examiner*—Robert M. Kilgore
*Attorney, Agent, or Firm*—Wenderoth, Lind & Ponack

[57] ABSTRACT

An automatic money dispenser controlled by a central processing unit comprises a memory register for storing money dispensing data including an amount of money to be dispensed, a memory check circuit for determining monetary denominations necessary for the dispensation of the amount of money from the money dispensing data stored in the memory register, a control circuit for setting a money container at a money transferring position according to the monetary denominations determined by the memory check circuit, a dispensed money counting circuit for counting money dispensed out of the money container, and a comparison circuit for comparing the data stored in the memory register with that produced by the dispensed money counting circuit, whereby the amount of money is correctly dispensed from the automatic money dispenser.

The money container is provided with a detector which detects the fact that the number of pieces of money left in the money container is a predetermined maximum number of pieces necessary for one money dispensing operation and produces a detection signal. On the basis of this detection signal thus produced and a coincidence signal produced when the amount of money to be dispensed coincides with that dispensed, the money dispensing operation is suspended.

5 Claims, 9 Drawing Figures

AUTOMATIC MONEY DISPENSER

SUMMARY OF THE INVENTION

Accordingly, it is a first object of this invention to provide an automatic money dispenser which is provided as a terminal unit of a central processing unit to correctly dispense money of a plurality of denominations according to money dispensing data issued from the central processing unit and can be therefore employed as an automatic money dispenser in an on-line banking system.

A second object of the invention is to provide an automatic money dispenser controlled by a central processing unit whose circuit is simplified in its entirety with respect to a parity check operation and a money dispensing operation with a plurality of denominations.

A third object of the invention is to provide an automatic money dispenser controlled by a central processing unit in which a manual money dispensing operation can be carried out without affecting the data transmission system of the central processing unit, whereby supply of money into a money container, maintenance of the automatic money dispenser and trial dispensation of money can be readily carried out.

A fourth object of the invention is to provide an automatic money dispenser controlled by a central processing unit in which an erroneous operation of a manual money dispensing circuit will not affect a money dispensing operation which is conducted according to money dispensing data issued to the automatic money dispenser from the central processing unit, by the addition of a relatively simple circuit.

A fifth oject of the invention is to provide a method for providing an unattended automatic money dispenser.

The manner in which the foregoing objects and other objects are achieved by this invention will become more apparent from the following detailed description and appended claims when read in conjunction with the accompanying drawings.

BACKGROUND OF THE INVENTION

This invention relates to automatic money dispensers and more particularly to automatic money dispensers provided as terminal units of a central processing unit.

Figure 1:
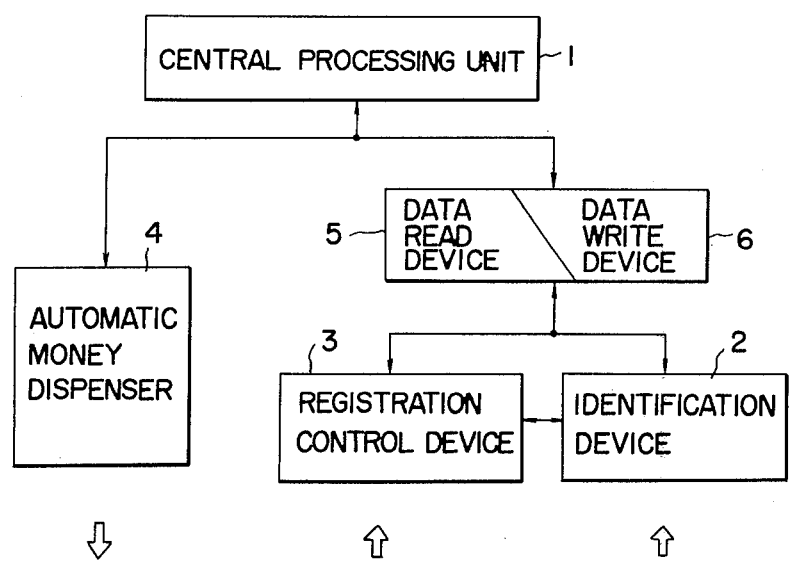
FIG. 1 is a block diagram illustrating a control system in which an automatic money dispenser according to this invention is employed.

Such an automatic dispenser 4 is connected to a central processing unit 1 as is shown in FIG. 1. That is, the automatic money dispenser 4 in combination with an identification device 2 for identifying a person requesting the dispensation of money and a registration control device 3 is located at a position remote from the central processing unit 1.

The person first inserts identification means such as a bankbook, a magnetic card or an identification card into the identification device 2, and then applies, for instance, a personal code, a secret number or a bankbook number provided on these identification means to the registration control device through input means (for instance a push button switch) provided in the registration control device 3. In this operation, the control device 3 compares the data of the personal code and bankbook number read by the device 2 with the data applied to the control device 3, and if coincident with one another, the control device 3 transmits the data thus read to the central processing unit 1 through a data read device 5.

The central processing unit 1 compares the data thus transmitted with a number which is assigned to user and has been stored therein in advance, and, when the former coincides with the latter, transmits an identification signal representing the fact that he is the authorized person to the control device 3 through a data write device 6. Thereupon, the control device 3 displays an indication so that he can make the applications for an amount of money including the desired monetary denominations.

Application for the money to be dispensed is made by operating ten keys provided in the control device 3. The data thus applied is transmitted to the central processing unit 1 through the data read device 5.

The central processing unit 1 compares the amount of money requested with the amount of money deposited by him. When the former is less than the latter, the unit 1 transmits a signal representing the fact that the dispensation of the amount of money is allowable, to the control device 3. In response to this signal, the control device 3 displays as indication to instruct him to apply a dispensation starting command signal thereto. According to this indication, he applies the dispensation starting command signal to the control device 3 by operating a start button provided therein. The dispensation starting command signal thus applied is transmitted through the data red device 5 to the central processing unit 1.

Based on the dispensation starting command signal, the central processing unit 1 transmits to the automatic money dispenser 4 a data signal including dispensation data (an amount of money to be dispensed) for instructing the dispensation of money. Then, the automatic money dispenser 4 starts to transfer money to a money dispensing outlet in response to this data signal and, upon completion of the money dispensing operation, transmits a dispensation ending signal to the central processing unit 1.

Based upon this dispensation ending signal, the central processing unit 1 rewrites the balance and transmits the balance data to the identification device 2 through the data write device 6. According to this data thus transmitted, the identifiation device 2 typewrites the balance on, for instance, the banknote inserted therein. Thus, one cycle of operation of the automatic money dispenser is completed.

In the automatic money dispenser employed, it is an essential condition to be able to correctly dispense money with an amount of money which is designated by a dispensation data from a central processing unit.

Furthermore, in the automatic money dispenser decribed above, a parity check is, in general, carried out in order to check if there is any error in data transmitted from the central processing unit. In addition to the function of the parity check, it is necessary for the automatic money dispenser to be able to dispense money of a plurality of monetary denominations.

Figure 5:
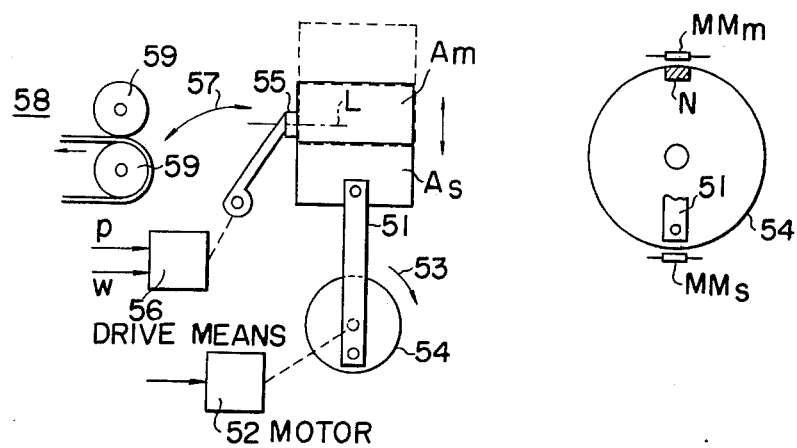
FIG. 5 is an explanatory diagram illustrating a money container positioning mechanism of the automatic money dispenser shown in FIG. 2.

In addition, the automatic money dispenser is provided with a money container assembly comprising, for instance, two money containers Am and As which store, for instance, 10,000-yen bank notes and 1,000-yen bank notes, respectively, as is shown in FIG. 5.

The money container assembly is movably connected through a connecting lever 51 to a disk 54 which is rotated by an electric motor 52. Therefore, the money container assembly can be moved vertically. More specifically, if, for instance, the money container Am is preset to a position confronting a suction head 55, that is, at a money transferring position L, the money container As is raised to the money tranferring position L when the disk 54 has been rotated through 180° by the motor 52.

The suction head 55 is swung between the money container and a belt-conveyer 58 by drive means 56 to insert bank notes one by one between the rollers 59 of the belt conveyer 58. The bank notes thus inserted are transferred to the money dispensing outlet.

In a money transferring system such as described above with reference to FIG 5, it is essential that after the money container Am or As has been set at the money transferring position L, the suction head 55 can surely transfer bank notes to the belt conveyer 58.

Furthermore, if the automatic money dispenser having the money transferring system is employed as a terminal unit of the central processing unit 1, it is necessary in the case of, for instance, supply of bank notes into the money containers, maintenance and inspection of the money dispenser, or trial dispensation of money with a denomination selected as desired that a manual money dispensing operation can be carried out without affecting the transmission system of the central processing unit. Furthermore, it is desirable that the manual money dispensing operation can be achieved by adding a relatively simple circuit to the automatic money dispenser.

A conventional money dispenser is attended by a person in order to overcome inconvenience which is experienced when a money container is emptied or almost emptied. When the money container has been emptied or immediately before it has been emptied, while raising an alarm for it the person causes all of the money left to be dispensed and then supplies money into the money container.

However, in this method, if the number of pieces of money left in the money container is less than the number of pieces of money to be dispensed out of the money dispenser, that is, the money container is emptied before the completion of one cycle of the money dispensation operation described above, the money container must be supplied with money by him while the money transferred before the container has been emptied is stored at the money dispensing outlet. Thereafter the operator or the person to be paid operates the money dispenser again to dispense an amount of money corresponding to the shortage.

Accordingly, this method is unreliable in the correctness of number of pieces of money. Furthermore, this method is disadvantageous in that the money dispenser must be attended by a person responsible for it at all times.

DETAILED DESCRIPTION OF THE INVENTION

Figure 2:
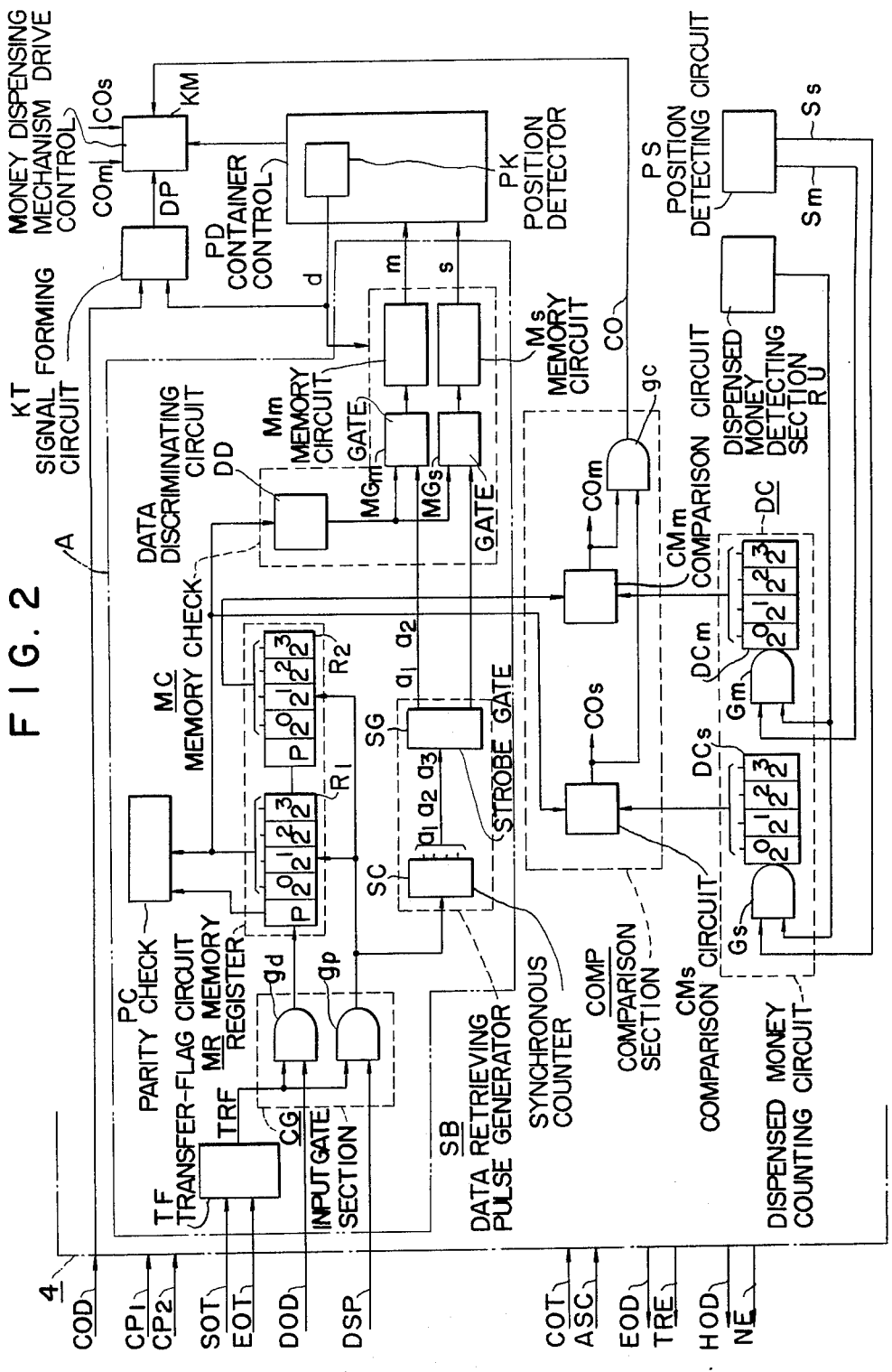
FIG. 2 is a block diagram illustrating one example of the automatic money dispenser according to the invention.

With reference to FIG. 2, there is shown one example of an automatic money dispenser according to this invention which dispenses an amount of money less than 100,000 yen with 10,000-yen and 1,000-yen bank notes for instances.

As is shown in FIG. 2, a pair of clock pulses $CP_1$ and $CP_2$ (FIG. 3) different in phase from each other are applied to an automatic money dispenser 4 from a central processing unit 1 (FIG.1) at all times. Furthermore, several money dispensing operation command signals, that is, a data transmission starting signal SOT, a money dispensing data signal DOD (hereinafter referred to as dispensation data DOD when applicable), a data transmission ending signal EOT, an instruction signal COD for starting a money transferring operation, and an instruction signal COT for starting a money dispensing operation are applied to the money dispenser 4. In this connection, the term "money transferring operation" means that money is transferred to a money dispensing outlet from a money container, while the term "money dispensing operation" means that money is dispensed out of the money dispensing outlet. The signals SOT, DOD, DSP and EOT are shown in FIG. 3 and will become more apparent from the following descriptions.

Figure 3:
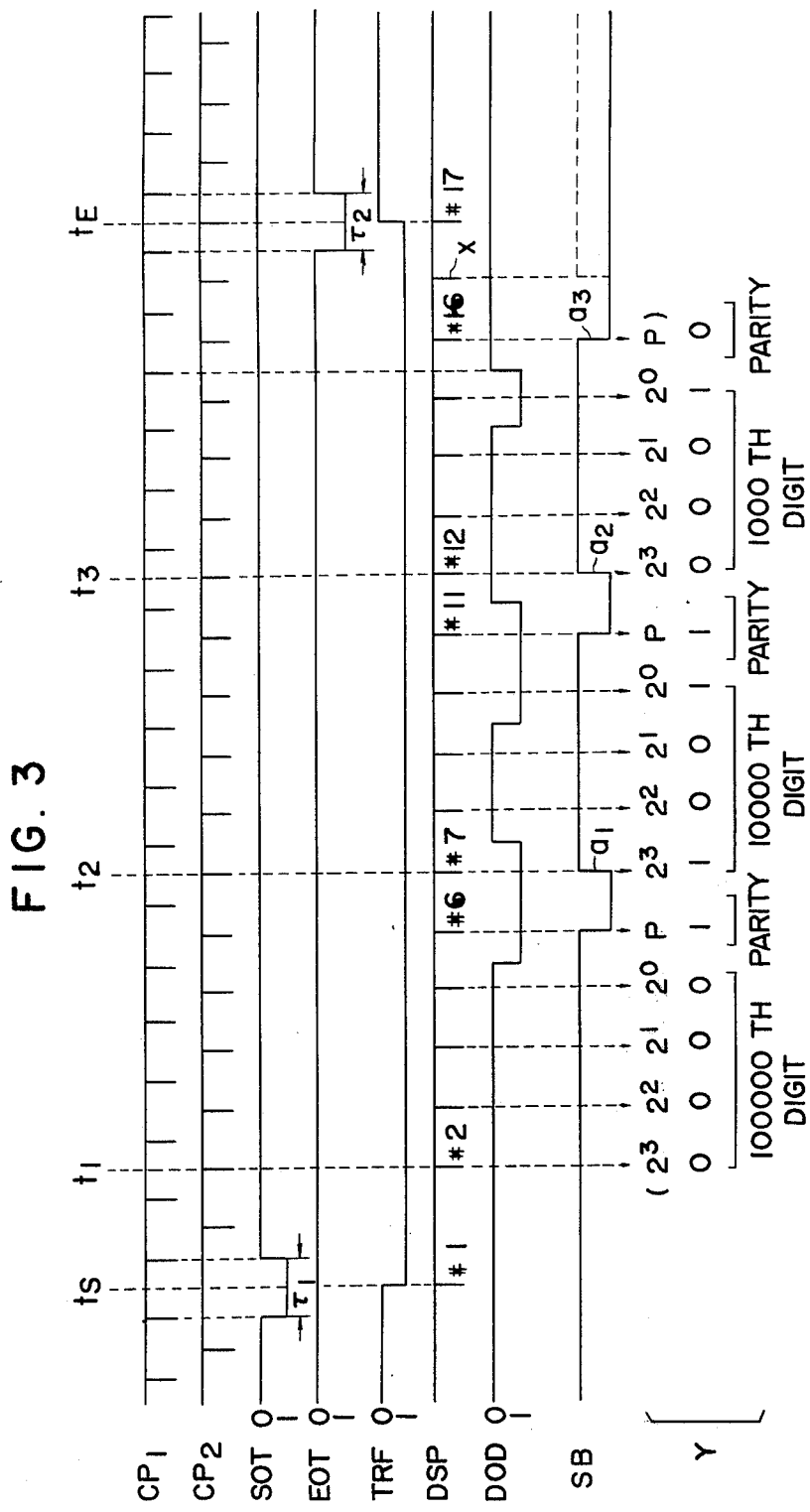
FIG. 3 depicts waveform diagrams illustrating various signals employed for the description of the automatic money dispenser shown in FIG.. 2.

As is apparent from FIG. 3, before the dispensation data signal DOD is applied to the money dispenser 4 from the central processing unit 1, the data transfer starting signal SOT whose pulse duration $\tau_1$ is equal to the interval between two adjacent clock pulses $CP_1$ is supplied to the money dispenser 4, while the first data shift pulse DSP reaches the money dispenser 4 at the time instance when the clock pulse occurs during the pulse duration $\tau_1$ of the data transfer starting signal SOT. The arrival of the first data shift signal DSP means that the second through the 16 pulses DSP sequentially arrive to the money dispenser 4. The state (represented by logic 1 and logic 0) of the dispensation data DOD existing at the arrivals of these pulses DSP, represent the values of bit in the dispensation data, respectively.

In this example, the dispensation data includes three digits corresponding to the 100,000th digit, the 10,000th digit and the 1,000th digit which are applied to the money dispenser in the order described, or in a mode of series transmission, as digital signals in a binary-coded decimal code. Each of the digits consists of four data bits $2^3$ through $2^0$ and a parity bit P. In this connection, it is assumded for convenience in description that the content of the 100,000th digit is always 0 in the decimal system. For instance, the money dispensing data signal DOD shown in FIG. 3 is 091 in the decimal system (the amount of money to be dispensed is 91,000 yen), and as is shown in Y, FIG. 3, the bits of the 100,000 digit are 0000 and the parity bit thereof is 1.

After the entire money dispensing data signal DOD has been applied to the money dispenser 4, the data transmission ending signal EOT, similar to the data transmission starting signal SOT described before, is applied to the same, and the seventeenth pulse DSP is applied to the money dispenser 4 at the time when a pulse $CP_2$ occurs during the pulse duration $\tau_1$ of the signal EOT. Thus, the transmission of the dispensation data DOD from the central processing unit 1 to the money dispenser 4 is completed.

The automatic money dispenser 4 according to this invention comprises two systems; that is, a money dispensing data check system A and a money dispensing mechanism control system.

The money dispensing data check system A is adapted to store monetary denominations necessary for the dispensation of an amount of money indicated by the dispensation data DOD, and comprises: an input gate section CG provided for the application of the dispensation data DOD and the data shaft pulses DSP; and a transfer-flag circuit TF for forming a control signal which is applied to the gate section CG. The transfer-flag circuit TF receives the data transmission starting signal SOT and the data transmission ending signal EOT, and produces control signals TRF which, as is shown in FIG. 3, become 1 at the occurence of the clock pulse $CP_2$ during the pulse duration of signal SOT and become 0 at the occurrence of the clock pulse $CP_2$ during the pulse duration of the signal EOT. The control signal TRF is applied, as a gate opening signal, to two gates gd and gp in the gate section CG.

The money dispensing data check system A further comprises a memory rigister MR constituted by two shift registers $R_1$ and $R_2$ cascade-connected and each having five bits for one digit. When the dispensation data DOD is applied through the gate gd to the register $R_1$, the bits of digits in the dispensation data are sequentially stored therein as the shift pulses DSP are applied thereto through the gate gp. The contents thus stored in the register $R_1$ are applied in parallel to a parity check circuit PC where a parity check is conducted when the dispensation data for one digit is stored in the register $R_1$.

The money dispensing data check system A surther comprises a memory check circuit MC and a data retrieving pulse generator SB. The memory check circuit MC comprises: a data discriminating circuit DD which receives an output from the register $R_1$ and, when the content of the outut is other than 0 in the decimal system, produces a discrimination output; and memory circuits Mm and Ms for storing the discrimination outputs through gates MGm and MGs, respectively (hereinafter referred to as a 10,000-yen memory circuit Mm and a 1,000-yen memory circuit Ms, respectively, when applicable). The pulse generator SB comprises: a synchronous counter SC which counts the second through the sixtenth pulses of the data shift pulse signal DSP obtained through the gate gp and, when the content counted thereby becomes 5, 10 and 15, produces first, second and third output pulses $a_1$, $a_2$ and $a_3$, respectively; and a strobe gate SG which, when the first output pulse $a_1$ and the second one $a_2$ are produced, applies the output pusles $a_1$ and $a_2$ to the gate MGm to open it and, when the third output pulse $a_3$ is produced, applies the output pulses $a_3$ to the gate MGs to open it.

In the money dispensing data check system thus organized, when the signals $a_1$ and $a_2$ have been applied to the gate MGm from the gate SG, the contents of the 100,000th digit and the 10,000th digit are fully stored in the register $R_1$. Therefore, if these contents are other than 0 in the decimal system, the data discriminating circuit DD produces a discrimination output. As a result, a monetary denomination of 10,000-yen is stored in the memory circuit Mm. On the other hand, a monetary denomination of 1,000-yen is stored in the memory circuit Ms when the signal $a_3$ is applied to the gate MGs from the date SG.

The money dispensing mechanism control system of the automatic money dispenser comprises: a money container drive control circuit PD for setting a money container assembly, which contains money separately stored according to monetary denomination, at a predetermined money transferring position (hereinafter referred to as a container control circuit PD when applicable). The money container assembly consists of a 10,000-yen money container and a 1,000-yen money container in this case. The container control circuit PD includes a position detector PK which operates to detect the fact that any money container is set at the money transferring position.

When the money circuit Mm (or Ms) produces its memory output $m$ (or $s$), the container control circuit PD operates to set the 10,000-yen money container (or the 1,000-yen money container) at the money transferring position according to the memory output $m$ (or $s$). When the money container has been set at the money transferring position, the position detector PK detects it and produces a detection signal $d$, and this detection signal $d$ thus produced is applied to the memory check circuit MC to clear the contents stored in the memory circuit Mm and Ms.

In this operation, if both of the memory circuits Mm and Ms have their memory outputs $m$ and $s$, respectively, first the 10,000-yen money container is set at the money transferring position with the aid of the output $m$ from the memory circuit Mm, and, after a required number of 10,000-yen bills have been transferred out of the money container, the 1,000-yen money container is moved to the money transferring position.

The detection signal $d$ from position detector PK is further applied to a money transferring operation start signal forming circuit KT to which the above-described instruction signal COD is applied from the central processing unit 1. Upon application of the two signals $d$ and COD, the circuit KT applies a money-transferring-operation start signal DP to a money dispensing mechanism drive control circuit KM which operates to control the drive of a money transferring mechanism (not shown), as a result of which the money transferring mechanism is caused to transfer money piece by piece from the money container selectively set at one of the money transferring positions. One example of the container control circuit PD will be described in detail later.

The money dispensing mechanism control section further comprises a dispensed money counting circuit DC and a comparison section COMP. The dispensed-money counting circuit DC is provided with counters DCm and DCs which are provided separately according to the denominations of money to be dispensed. The circuit DC is controlled by count pulses from a dispensed-money detecting section RU provided at the money dispensing outlet. That is, the count pulses are applied through input gates $gm$ and $gs$ to the counters DCm and DCs.

Furthermore, a position detecting circuit PS is provided in connection with a mechanism for setting the money container in place. This circuit PS produces detection signals Sm and Ss respectively when the 10,000-yen money container and the 1,000-yen money container are set at the money transferring position. The signals Sm and Ss thus produced are applied, as gate opennning signals, to the gate gm and gs, respectively. As a result, the respective number of 10,000-yen and 1,000-yen notes dispensed are counted. In this operation, the contents in the counters DCm and DCs are converted into an amount of money dispensed.

The comparison section COMP is provided for comparing a dispensation data from the central processing unit 1 with the amount of money dispensed. This comparison section COMP comprises comparison circuits CMm and CMs provided separately according to the denominations of money to be dispensed.

An output from the second register $R_2$ and that from the counter DCm are applied to the comparison circuit CMm and are compared with each other, while an output from the first register $R_1$ and that from the counter CMs are applied to the comparison circuit CMs so as to be compared with each other. When these outputs coincide with each other in the respective comparison circuits, these circuits CMm and CMs produce coincidence outputs COm and COs, respectively. These outputs COm and COs are applied to an output gate gc, which in turn produces a complete coincidence output CO. This coincidence output CO is applied to the control circuit KM, while the coincidence outputs COm and COs are further applied directly to the control circuit KM.

When the output COm (COs) is produced by the comparison circuit CMm (CMs) in the dispensation of 10,000-yen notes (1,000-yen notes), the operation of the money dispensing mechanism is temporarily suspended. Thereafter, the next money container is moved to the money transferring position and the money dispensing mechanism is caused to start its next operation.

When the coincidence signal CO is produced from the comparison circuit section COMP, that is, the amount of money transferred to the money dispensing outlet has coincided with the contents of the dispensation data, the automatic money dispenser 4 applies a dispensation completion signal EOD, representing the completion of the dispensation of money, to the central processing unit 1 after a confirmation circuit (not shown) has confirmed that the money dispenser 4 has correctly operated. After receiving this signal EOD, the central processing unit 1 issues the instruction signal COT to the money dispenser 4 to permit the dispensation of money. As a result, the money dispenser 4 is operated to further transfer the money retained at the money dispensing outlet to a payment outlet (not shown), and is then reset in its entirety.

In FIG. 2, reference character TRE designates a signal which is produced when the erroneous transmission of the dispensation data is detected, reference character HOD is a signal representing the occurrence of troubles such as bank notes are caught by something during the money transferring operation, and reference character NE designates a signal which is generated when the number of pieces of money in the money container is less than a predetermined number of pieces. These signals TRE, HOD and NE are applied from the money dispenser 4 to the central processing unit 1 where they are properly processed. In addition, reference character ASC designates a signal which is applied from the central processing unit 1 to the money dispenser 4 to reset the latter in its entirety when the central processing unit 1 and the money dispenser are energized.

The operation of the automatic money dispenser 4 thus organized will be described with the assumption that a money dispensing data signal DOD representing 91,000 as is shown in FIG. 3 is applied from the central processing unit 1 to the money dispenser 4.

If the transmission starting signal SOT is applied to the money dispenser 4, the circuit TF produces the signal TRF at the time instant ts (FIG. 3) to open the gate section CG.

When five pulses of from the second pulse to the sixth pulse in the shift pulse signal DSP are applied to the gate section CG starting at the time instant $t_1$ after the time instant $ts$, the data bits and parity bit for the 100,000th digit in the data signal DOD are written in the register $R_1$. In this case, the contents of the data bit and parity bit are 0000 (0 in the decimal system) and 1, respectively.

On the other hand, the pulse generator SB produces the pulse $a_1$ with the aid of the sixth pulse mentioned above. However, at this moment, no output is produced by the data discriminating circuit DD. Accordingly, nothing is stored in the 10,000-yen memory circuit Mm which is provided for storing the denomination 10,000-yen.

Similarly, when five shift pulses DSP of from the seventh pulse to the eleventh pulse are applied to the gate section CG starting at the time instant $t_2$, the data bits and parity bit for the 10,000th digit in the data signal DOD are written in the register $R_1$, while the data of the 100,000th digit stored in the register $R_1$ is shifted into the register $R_2$. In this case, the contents of the data bits and parity bit for the 10,000th digit are 1001 (9 in the decimal system) and 1, respectively. Accordingly, the data discriminating circuit DD produce its output, which is stored in the 10,000-yen memory circuit Mm when the pulse generator SB produces the pulse $a_2$ (or when the eleventh pulse DSP is counted).

When five shift pulses DSP of from the 12th pulse to the sixteenth pulse are applied to the gate section CG starting at the time instant $t_3$, the data bits and parity bit for the 1,000th digit in the data signal DOD are written in the register $R_1$ and the data of the 10,000th digit stored in the register $R_1$ is shifted into the register $R_2$. In this case, the contents of the data bits and parity bit for the 1,000th digit are 0001 (1 in the decimal system) and 0, respectively. Accordingly, the circuit DD produces an output, which is stored in the 1,000-yen money circuit Ms when the pulse generator SB produces the pulse $a_3$ (or when the 16th pulse DSP is counted).

Thereafter, upon arrival of the transmission ending signal EOT, the production of the signal TRF is suspended at the time instant $t_E$ to close the gate section CG. Accordingly, the contents for the 10,000th and 1,000th digits, that is, 1001 and 0001 are maintained stored in the registers $R_1$ and $R_2$, while the memory circuits Mm and Ms are maintained producing outputs $m$ and $s$, respectively. These outputs $m$ and $s$ are signals representing the denominations 10,000-yen and 1,000-yen, respectively (hereinafter referred to as a 10,000-yen signal and a 1,000-yen signal, respectively, when applicable).

When the 10,000-yen signal $m$ is thus produced by the memory circuit M$m$, the container control circuit PD first operates to set the 10,000-yen money container at the money transferring position, and, when the detection signal $d$ is produced by the position detector PK, the memory circuit Mm is reset.

Thereafter, when the instruction signal COD for starting the money dispensing operation is applied to the signal forming circuit KT from the central processing unit 1, the signal forming circuit KT produces a money-dispensing-operation starting signal DP. As a result, the money dispensing mechanism starts to transfer 10,000-yen notes one by one to the money dispensing outlet.

Under this condition, since the position detecting circuit PS has produced the detection signal indicating that the 10,000-yen money container is set at the money dispensing position, the pulses from the dispensed-money detecting section RU are applied to the counter DCm, and the content of the counter DCm are compared with the content 1001 the register $R_2$ by the comparison circuit CMm. Upon coincidence of these contents, the comparison circuit CMm produces the coincidence output COm, whereby the operation of the money dispensing mechanism is temporarily suspended.

Then, the circuit PD operates to set the money container to the 1,000-yen money dispensing position because the 1,000-yen signal $s$ from the memory circuit Ms has been kept applied to the container control circuit PD. Upon completion of setting the money container, the memory circuit Ms is reset by the detection signal $d$, while the operation of the money dispensing mechanism is started again by the drive control circuit KM.

In this connection, since the detection signal Ss indicating that the container is set at the 1,000-yen money dispensing position is produced by the position detecting circuit PS, pulses from the detecting section RU are applied to the counter DCs, and the contents in the counter DCs are compared with the content 0001 in the register $R_1$ by the comparison circuit CMs. Upon coincidence of these contents, the comparison circuit section COMP produces the complete coincidence output CO, whereby the operation of the money dispensing mechanism is stopped.

Thus, the amount of money, or 91,000 yen, is transferred to the money dispensing outlet in the form of two denominations; 10,000-yen and 1,000-yen bills. Upon dispensation of the money, a signal EOD representing the completion of a money dispensing operation is supplied from the money dispenser 4 to the central processing unit 1, which in turn supplies the instruction signal COT to the money dispenser 4 to further transfer the money stored at the money dispensing outlet to the payment outlet. Furthermore, the money dispenser 4 is reset in its entirety instruction the inruction signal COT to be ready for the next dispensation data.

Figure 4:
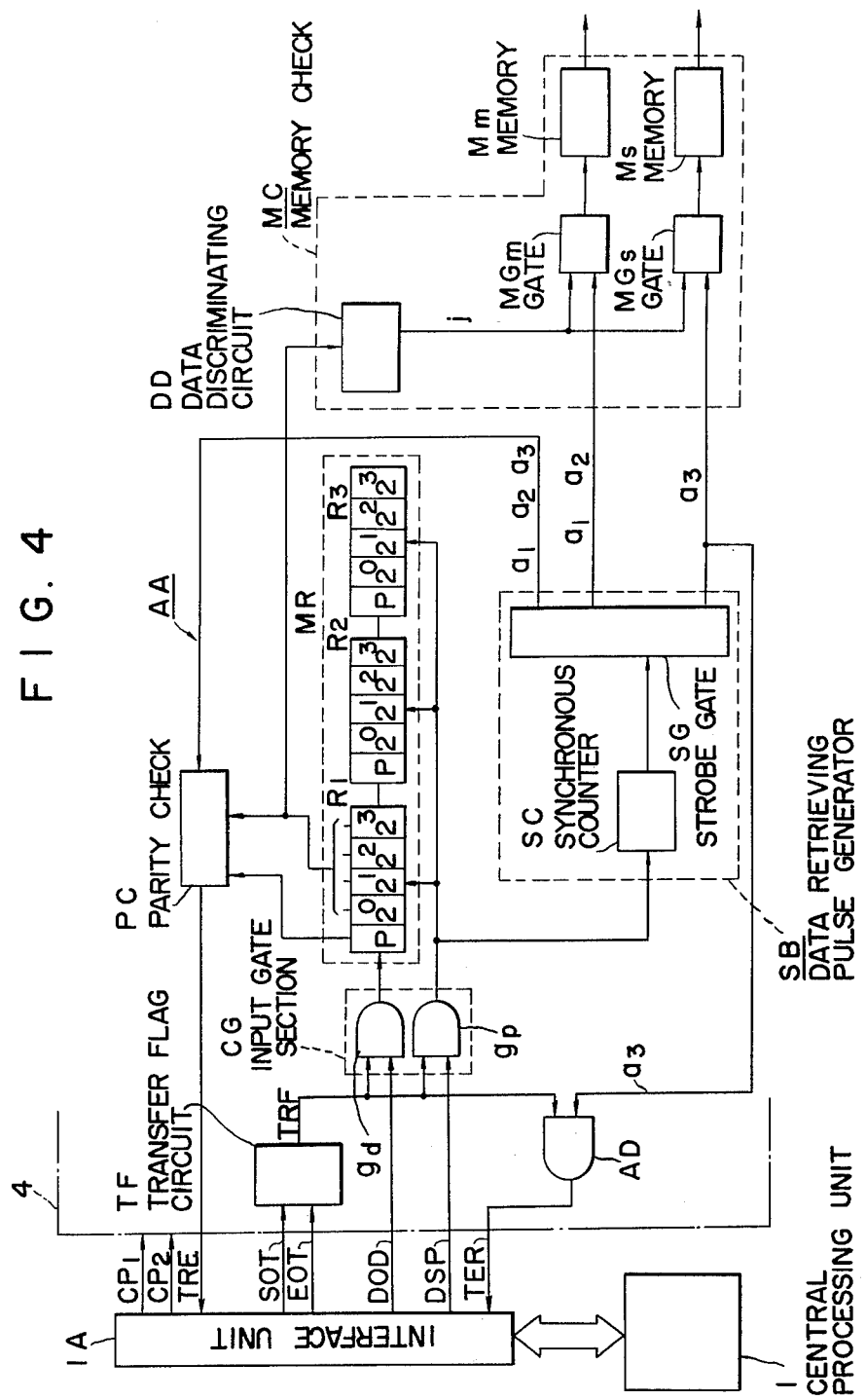
FIG. 4 is one modification of a money dispensing data check system in the automatic money dispenser illustrated in FIG. 2.

One modification of the dispensation data check system in the money dispenser is shown in FIG. 4.

As is apparent from the comparison of FIGS. 2 and 4, most of the circuits in the dispensation data check system AA in FIG. 4 are similar to those in the dispensation data check system A in FIG. 2. Accordingly, in the following description, the arrangement and operation of the circuits which have been described with reference to FIGS. 2 and 3 will be omitted as much as possible.

The dispensation data check system AA comprises the transferflag circuit TF, the input gate section CG. The pulse generator SB, and the memory check circuit MC all of which are the same as those in FIG. 2, and further comprises a memory register MR and a parity check circuit PC which are more or less different in operation and construction from those in FIG. 2.

The memory register MR contains three cascade-connected shift register $R_1$, $R_2$ and $R_3$ each having five bits for one digit. If a dispensation data siganl DOD (FIG. 3) is applied to the shift register $R_1$ through the gate $gd$, the dispensation data are successively written in the shaft register $R_1$ as shift pulses DSP are applied thereto through the gate $gp$.

The parity check circuit PC receives, in a parallel mode, the contents stored in the first shift register $R_1$ and sequentially receives the output pulses $a_1$, $a_2$ and $a_3$ of the synchronous counter SC through the strobe gate SG, to conduct a parity check on the content stored in the shift register $R_1$. If any transmission error is found by this parity check, the parity check circuit PC transmits the transmission error signal TRE, as an answer-back signal, to the central processing unit 1 through an interface unit 1A.

The operation of the dispensation data check system AA thus organized will be described with the assumption that the dispensation data signal DOD representing 91,000-yen (DOD in FIG. 3) is applied to the money dispenser 4 from the central processing unit 1.

In this case, upon the application of the transmission starting signal SOT, the circuit TF produces the signal TRF at the time instant ts (FIG. 3) to open the gate section CG.

When five shift pulses DSP of from the second pulse to the sixth pulse are applied to the money dispenser, that is, the gate $gp$ starting at the time instant $t_1$, the data bits and parity bit for the 100,000th digit in the data signal DOD (FIG. 3) are stored in the first shift register $R_1$ in response to the application of the five shift pulses. In this case, the contents of the data bits and parity bit are 0000 (0 in the decimal system) and 1, respectively. The pulse generator SB produces teh strobed output $a_1$ with the application of the sixth pulse DSP to open the gate MGm. In this operation, no output is produced by the data discriminating circuit DD and nothing is therefore stored in the 10,000-yen memory circuit Mm. On the other hand, the production of the strobed output $a_1$ causes the parity check circuit PC to carry out its parity check operation; however, in this case, there is no transmission error and no signal TRe is therefore produuced from the parity check circuit PC.

Then, when five shift pulses DSP of from the seventh pulse to the 11th pulse are applied to the gate $gp$ one after another starting at the time instant $t_2$, the data bit and parity bit for the 10,000th digit in the data signal DOD are written in the register $R_1$, while the data for the 100,000th digit stored in the register $R_1$ is shifted into the second register $R_2$. In this case, the content of the first register $R_1$ is 1001 (9 in the decimal system), and the circuit DD therefore produces its output $j$. This output $j$ is applied to the gate MGm, while the output $a_2$ from the gate SG is applied to the same gate MGm when the counter SC counts the eleventh pulse. As a result, the denomination 10,000-yen is stored in the memory circuit Mm. On the other hand, the production of the strobed output $a_2$ from the strobe gate SG causes the parity check circuit PC to carry out its operation. In this case, since there is no transmission error, no transmission error signal TRE is produced by the circuit PC.

Next, when five shift pulses DSP of from the twelfth pulse to the sixteenth pulse are applied to the gate $gp$ one after another starting at the time instant $t_3$, the data bits and parity bit for the 1,000th digit are written in the register $R_1$, while the data stored in the registers $R_1$ and $R_2$ is shifted into the registers $R_2$ and $R_3$, respectively. In this case, the content in the register $R_1$ is 0001 (1 in the decimal system) and the output $j$ is therefore produced by the data discriminating circuit DD. This output $j$ is applied to the gate MGs, while the output $a_3$ is output from the gate SG when the counter SC counts the 16th pulse. The output $a_3$ thus produced is applied to the same gate MGs, whereby the monetary denomination 1,000 is stored in the memory circuit Ms. On the other hand, the production of the strobed output $a_3$ from the strobe gate SG causes the parity check circuit PC to carry out its operation. In this case, there is no transmission error involved and no signal TRE is produced from the circuit PC.

Thereafter, upon application of the transmission ending signal EOT, the production of the signal TRF by the transfer-flag circuit TF is suspended to close the gate section CG. Accordingly, the contents in the registers $R_1$, $R_2$ and $R_3$ are maintained stored as they are.

Thus, the memory circuits Mm and Ms continue to store the monetary denominations 10,000-yen and 1,000-yen. The denominations thus stored are read out one after another and then the money container is moved to the 10,000-yen or 1,000-yen money dispensing position according to the denominations thus read out. Thereafter, money is transferred out of the money container by the money dispensing mechanism. This operation is suspended when the amount of money thus transferred coincides with the contents in the registers $R_1$, $R_2$ and $R_3$. Consequently, an amount of money corresponding to the content of a dispensation data signal DOD can be correctly dispensed out of the money dispenser 4.

Thus, according to this invention, the dispensation data check system is provided in which, based upon the dispensation data signal, the operation for detecting monetary denominations necessary for the dispensation of a required amount of money is carried out while the operation for checking for errors in the transmission of the dispensation data signal is also carried out. In addition, these operations are simultaneously carried out at the timing instant of a strobed output which is produced with the and of data shift pulses DSP whenever, of the dispensation data, data corresponding to each digit is applied to the money dispenser. Accordingly, only one parity check circuit provided in connection with the register $R_1$ is required to sufficiently achieve the parity check operation. Furthermore, in this dispensation data check system, the reading out of the contents in the memory register MR can be utilized commonly both for the detection of the monetary denominations and for the parity check operation. Therefore, it is possible to make the entire circuit of the system simple.

Thus, the dispensation data check system AA described above has a parity check function and a monetary denomination detection function.

If a simple circuit described below is added to the dispensation data check systems described above, the automatic money dispenser can have a detection function for detecting if the number of bits in the transmission data is normal or not, for instance, if any of the bits is omitted.

That is, the simple circuit is a complete transmission signal forming circuit represented by an AND circuit AD added to the dispensation data check system as is shown in FIG. 4.

The AND gate AD receives two inputs: that is, the output TRF of the transfer-flag circuit TF, and the output $a_3$ produced by the syncheonous counter SC when the last bit in the dispensation data is applied to the money dispenser (that is, when the sixteenth data shift pulse is applied to the money dispenser). Upon reception of these two inputs, the AND gate AD produces a complete transmission signal TER, while the central processing unit 1 reads this output TER and judges that there has been no error in the transmission of the dispensation data.

When the transmission of the dispensation data is completed without the production of the output $a_3$ from the synchronous counter SC, no output TER is produced by the circuit AD, and this is construed by the central processing unit as indicating the occurrence of errors in the data transmission. Accordingly, the fact that some of the bits in the transmission data were omitted, that is, although 15 bits should be transmitted as the dispensation data, bits whose number is less than 15 have been transmitted, is surely detected.

Sometimes, the number of bits transmitted as the transmission data may be larger than a predetermined value (fifteen in this case) due to some troubles. For instance, an extra pulse $x$ is added to the data shift pulses DSP during the transmission of the dispensation data, as is shown in DSP, FIG. 3. In this case, the counter SC counts this extra pulse $x$ and produces an output of the 0 level. Upon production of this 0 level output, the circuit AD is caused to sustain the production of its output. Accordingly, if the central processing unit 1 is so designed that is completes the reading of the complete transmission signal within the period of from the production of the output $a_3$ to the application of the transmission ending signal EOT, not only the omission of bits but also the addition of extra pulses can be detected with respect to the transmission data.

Thus, the provision of the complete transmission signal forming circuit as described above makes it possible to detect if the number of bits transmitted is correct or not. In this operation, the operation of counting the number of bits in the transmission data can be carried out by commonly utilizing the synchronous counter SC which is necessary for the detection of the monetary denominations. Accordingly, the circuit of the money dispenser can be made relatively simple when compared with that in which a counter for detecting the number of bits is separately provided.

The complete transmission signal forming circuit AD described above comprises the AND circuit; however, the AND circuit may be replaced by a NAND circuit.

One example of the container control circuit PD briefly described above with reference to FIG. 2 will be described in detail with reference to FIG. 7, which comprises a priority processing circuit 11 which determines the order of priority as to the monetary denominations in the dispensation of money, a money container setting circuit 12, and a manually operated switch circuit 13.

The priority circuit 11 comprises a memory circuit Bm for storing the monetary denomination 10,000-yen, a memory circuit Bs for storing the monetary denomination 1,000-yen, and an output circuit c provided on the output side of the memory circuit Bs.

The outputs m and s produced by the memory circuits Mm and Ms (FIG. 2) are applied to the memory circuits Bm and Bs, respectively. In this operation, the outputs m and s are written in the memory circuits Bm and Bs with the aid of a timing pulse t respectively, as a result of which logic outputs at the H level are produced at the output terminals Q of the memory circuits Bm and Bs, respectively.

The output Q of the memory circuit Bs and an output Q of the memory circuit Bm are applied to the output circuit C. The memory circuits Bm and Bs are reset by the coincidence signal COm and COs described before. Thus, when the outputs m and s are maintained stored in the memory circuits Bm and Bs, respectively, the output Q of the memory circuit Bm is produced, as a 10,000-yen dispensation signal $fm$, by the priority processing circuit 11. Thereafter, if the memory circuit Bm is reset by the coincidence signal COm, the output circuit c produces a 1,000-yen dispensation signal $fs$.

The money container setting circuit 12 comprises a 10,000-yen dispensation memory circuit Gm, a 1,000-yen dispensation memory circuit Gs, a control circuit Hm for moving a 10,000-yen money container to the money transferring position, a control circuit Hs for moving a 1,000-yen money container to the money transferring position, and a drive circuit I provided for the electric motor 52.

The memory circuit Gm (or Gs) stores the dispensation signal fm (or fs) with the aid of the timing pulse t and produces an output of the H level. This output is applied through an AND gate Jm and a wired OR gate K to the drive circuit I whereby the disk 54 (FIG. 5) is rotated in the direction of the arrow 53.

On the other hand, the control circuit Hm (or Hs) is connected to a position detecting switch MMm (or MMs) which is provided in connection with the disk 4. When the switch MMm (or MMs) is opened, the control circuit Hm (or Hs) produces an output at the $H$ level. Thus, the gate Jm (or Js) is maintained open until the switch MMm is closed. Under this condition, if the switch MMm (or MMs) is closed, the control circuit Hm (or Hs) produces an output at the L level, as a result of which the gate Jm (or Js) is closed and the rotation of the disk 54 is therefore stopped.

Figure 6:
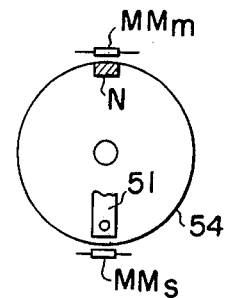
FIG. 6 is also an explanatory diagram illustrating position detecting switches employed in a money container drive control circuit shown in FIG. 7.

The switches MMm and MMs are reed switches and are provided oppositely above and below the disk 54 which is provided with a permanent magnet N at a part of the periphery thereof, as is shown in FIG. 6, so that, when the money container Am (or As) shown in FIG. 5 reaches the money transferring position, the swtich MMm (or MMs) is closed.

The container control circuit PD is further provided with a dispensation memory circuit O which stores the previously described instruction signal COD applied to the money dispenser from the central processing unit, with the aid of the timing pulse $t$ and is reset by the previously described instruction signal COT which is applied to the money dispenser from the central processing unit in order to transfer the money transferred to the money dispensing outlet to the payment outlet when the transfer of money to the money dispensing outlet has been completed.

An output Q of the dispensation memory circuit O is applied, as a busy signal $p$, to the output circuit $c$, whereby the 1,000-yen dispensation signal $fs$ is produced by the output circuit.

The manually operating switch circuit 13 is provided for the purpose of manually carrying out the money dispensing operation of the money dispenser and comprises switches Qm and Qs which are provided respectively for the dispensation of 10,000-yen bills and 1,000-yen bills.

A terminal of the switch Qm (or Qs) is connected to a power source at the H level. When the switch Qm (or Qs) is closed, a signal $rm$ (or $rs$) for the manual dispensation of 10,000-yen money (or 1,000-yen money) is produced therefrom. The signal $rm$ (or $rs$) thus produced is applied through an OR circuit SSm (or SSs), through which the signal $fm$ (or $fs$) is applied to the memory circuit Gm (or Gs), to the memory circuit GM (or Gs) to be stored therein.

In the passages of the signals rm and rs, there are provided AND gates Tm and Ts, respectively, which receive an output Q of the memory circuit O, that is, an output obtained by inverting the busy signal $p$. Thus it is impossible to Thus, out a manual money dispensation by the operation of the switches Qm and Qs during the period when the money dispenser is dispensing money in accordance with the instructions from the central processing unit. This is, the combination of the memory circuit O and the AND gates Tm and Ts forms a lock circuit which prevents manual dispensation of money.

Manual resetting switches Um and Us are provided for the memory circuits Gm and Gs, respectively.

The operation of the container control circuit thus organized will be described. Upon application of the denomination signals $m$ and $s$ to the respective memory circuits Bm andn Bs, the circuit 11 immediately produces the signal fm for the dispensation of 10,000-yen money, and the signal fm thus produced is stored in the memory circuit Gm. In this operation, if the 10,000-yen money container Am is not at the money transferring position L (FIG. 5), the magnet N provided in the disk 54 does not confront the switch MMm, that is, the switch MMm is maintained opened. Accordingly, the motor 52 is rotated to move the container Am to the money transferring position L (FIG. 5).

As soon as the container Am is set at the money dispensing position L, the magnet N confronts the switch MMm to open the latter. Accordingly, the gate Jm is closed to stop the rotation of the motor 52. To the end, the container Am is fixed at the money transferring position L, and the money dispenser waits for the arrival of the instruction signal COD requesting the start of the money dispensing operation, from the central processing unit.

upon arrival of the instruction signal COD at the money dispenser, the circuit O produces the busy signal $p$, which is applied to the output circuit $c$ and to the suction head driving means 56 (FIG. 1) whereby money in the 10,000-yen money container is transferred to the money dispensing outlet. In this operation, the output Q applied to the output circuit C from the memory circuit Bm is at the L level and no signal $fs$ is therefore produced by the priority processing circuit 11.

When a predetermined number of 10,000-yen bills have been transferred to the money dispensing outlet in accordance with the dispensation data supplied H the central processing unit, the coincidence signal COm previously described is obtained. The coincidence signal COm is applied to the memory circuit Bm to reset the latter and to the memory circuit Gm through an OR gate Vm to reset the memory circuit Gm. In this operation, the output Q of the memory circuit Bm is changed to the R level and the output circuit C produces the signal $fs$, which is stored in the memory circuit Gs.

Similarly as in the dispensation of 10,000-yen money, the 1,000-yen money container is set at the money transferring position L and the coincidence signal COs obtained upon completion of the dispensation of 1,000-yen money resets the memory circuits Bs and Gs.

Figure 7:
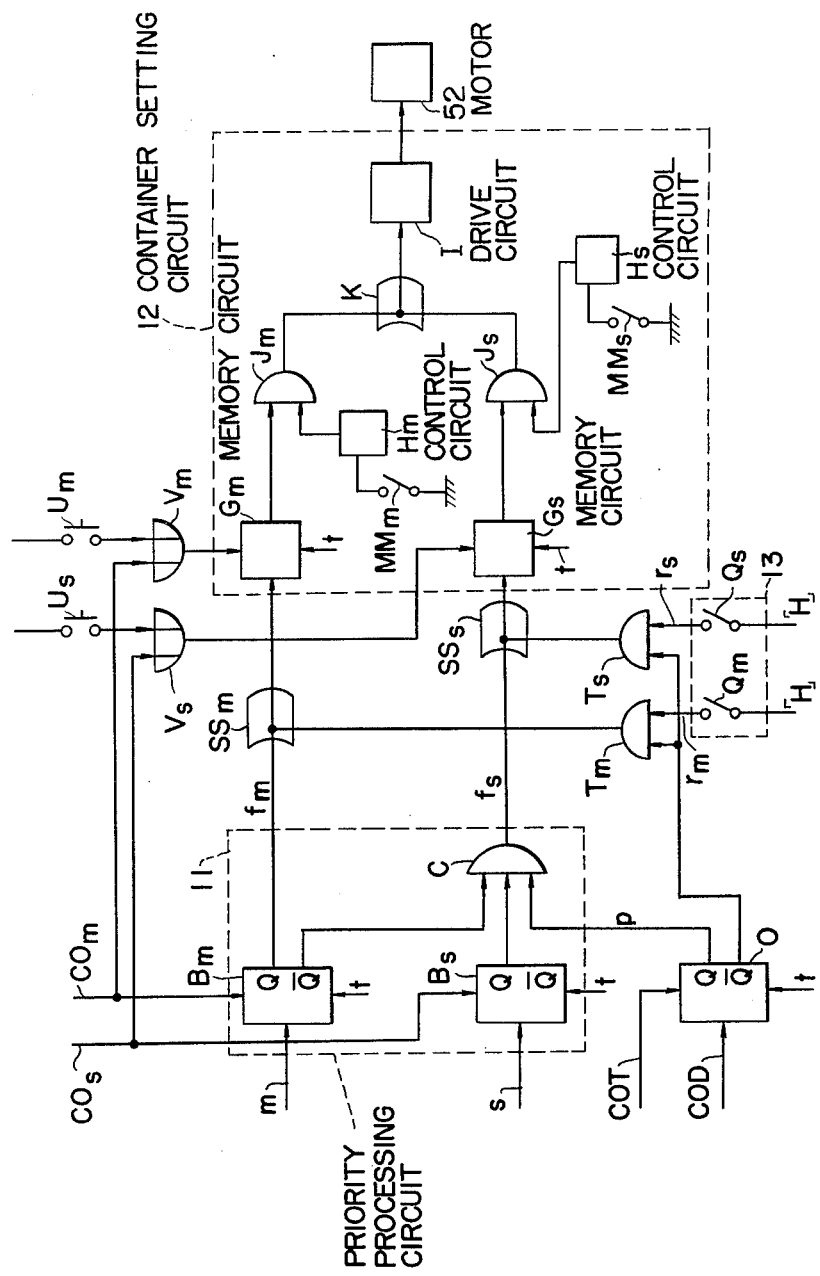
FIG. 7 is a block diagram illustrating the money container drive control circuit in the automatic money dispenser shown in FIG 2.

As soon as the transfer of 10,000-yen and 1,000-yen bills to the money dispensing outlet is completed, the central processing unit sends the instruction signal COT for the dispensation of money to the money dispenser, whereby the memory circuit O is reset and the whole circuit shown in FIG. 7 is therefore restored to its original conditions.

On the other hand, in the case where money is to be manually dispensed or a money container selected as desired is to be moved to the money transferring position, the switch Qm (or Qs) is closed as required. As a result, the memory circuit Gm (or Gs) stores the signal $rm$ (or $rs$). Accordingly, as in the case described above, the container Am (or As) is moved to the money transferring position L, the switch MMm (or MMs) is closed, and thereafter the container Am (or As) is held at the money transferring position L. Under this condition, if the manual busy signal $w$ is applied to the drive means 56 (FIG. 5), money in the money container Am (or As) is transferred to the conveyer 58 (FIG. 1).

As was described above, the operation of the manual operating switch circuit 13 causes a selected money container to move to the money transferring position as required, without affecting the command signals issued from the central processing unit, and the circuit to do so is very simple. Accordingly, the supply of money in the money containers, the maintenance and inspection of the money dispenser, and the trial dispensation of money selected as desired are readily accomplished.

heretofore, in order to supply money in the money containers regardless of the positions thereof, it has been necessary to provide a money supplying outlet for each of the positions which the money containers take. However, according to this invention, the supply of money in the money containers can be achieved through only one money suppling outlet which is provided in connection with the money transferring position. This contributes to the simplification of the money dispenser.

Furthermore, the container control circuit shown in FIG. 7 is provided with the lock circuit which conteracts the manual dispensation signals $rm$ and $rs$, as was described above. Therefore, even if the manual operating switch 13 is erroneously operated while the money dispenser is carrying out the money dispensing operation in accordance with the commands from the central processing unit, the money dispensing operation will not be affected by the erroneous operation of the manual operating switch 13. Thus, the commands from the central processing unit are processed with priority by the utilization of the output $\overline{Q}$ of the memory circuit O provided for the formation of the money dispensation signal $fs$ of the output circuit C. Accordingly, it can be said that the processing of the commands from the central processing unit with priority can be achieved by the addition of a very simple circuit.

The output circuit C is constituted by an AND circuit, but the AND circuit may be replaced by a NAND circuit. Similarly, the AND circuits Jm, Js, Tm and Ts may be replaced by NAND circuits.

The arrangement of the money containers and the mechanism for driving them shown in FIG. 5 shall be interpreted as illustrative only, not as limitative of the invention. Furthermore, the arrangement of the switches MMm and MMs is also shown by way of example and can be variously modified. All that is necessary is to detect the arrival of the money container at the money transferring position in connection with the mechanism which operates to set the money container at the money transferring position.

The container control circuit has been described in connection with the dispensation of 10,000-yen and 1,000-yen bills. However, if it is necessary to dispense money of more than or less than two monetary denominations, it can be achieved by increasing or decreasing the circuits related to the monetary denominations according to the number of monetary denominations added or reduced.

This invention has been described in connection with the dispensation of 10,000-yen and 1,000-yen money. However, the principle of the invention can be applied to the dispensation of more denominations.

For instance, the dispensation of 100-yen, 10-yen and 1-yen money in addition to 10,000-yen and 1,000-yen money out of the money dispenser, can be achieved by increasing the numbers of the registers in the memory register circuit MR, the denomination memory circuits in the memory check circuit MC, the output pulses of the data retrieve pulse generator SB, the comparison circuits in the comparison section COMP, and the counters in the dispensed money counting circuits DC according to the increase of monetary denominations.

Furthermore, the dispensation of 5,000-yen, 500-yen, 50-yen and 5-yen money can be achieved in the same manner as described above. However, in this case, it is necessary that the data discriminating circuit DD be so designed as to discriminate if the content in the register $R_1$ is 1 through 4, or 5, or 6 through 9 in the decimal system, so that if the content in the register $R_1$ is 1 through 4, 1,000-yen, 100-yen and 1-yen money is dispensed, if it is 5, 5,000-yen, 500-yen, 50-yen and 5 yen money is dispensed, and if it is 6 through 9, 1,000-yen, 100-yen, 1-yen, 5,000-yen, 500-yen, 50-yen and 5-yen are dispensed, respectively.

For instance, in the case where 10,000-yen, 5,000-yen and 1,000-yen bank notes are to be dispensed out of the automatic money dispenser, the data discriminating circuit DD in the momory check circuit MC can be so designed that when the content in the memory register $R_1$ is 1 through 4 in the decimal system, it produces a first discrination output, when the content is 5, it produces a second discrimination output, and when the content is 6 through 9, it produces the first and the second discrimination output.

The first discrimination output is applied to a 10,000-yen memory circuit and a 1,000-yen memory circuit through a first gate and a third gate, respectively, while the second discrimination output is applied to the 10,000-yen memory circuit and a 5,000-yen memory circuit through the first gate and a second gate, respectively.

Furthermore, the strobed outputs $a_1$ and $a_2$ are applied to the first gate, while the strobed output $a_3$ is applied to the second and the third gate.

Furthermore, this invention has been described in connection with the case where the 10,000th digit in the dispensation data is O at all times. The problems caused by the fact that the 10,000th digit is other than O can be solved by increasing the registers in the memory register MR and the comparison circuits in the comparison section COMP. In addition, the number of digits in the dispensation data may be increased more than 3.

According to another aspect of this invention, a method of temporarily suspending the money dispensing operation by detecting the fact that there is no money left in the money container will be described with reference to FIGS. 8 and 9. This method is especially suitable for an unattended money dispenser.

Figure 8:
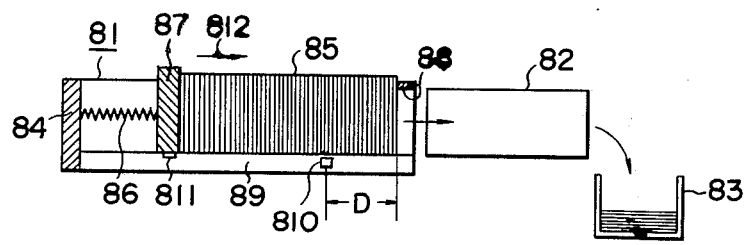
FIG. 8 is an explanatory diagram illustrating a money container employed in the automatic money dispenser according to the invention.

Shown in FIG. 8 are a money container 81, a money dispensing mechanism 82, and a tray 83 provided at the money transferring outlet on the money transferring side of the money dispensing mechanism 82.

The money container 81 comprises a box 84 without a top plate, a money retaining plate 87 which is adapted to retain a number of pieces of money (bank notes in this case) stacked in order in the box 84, and a spring 86 for pushing the bank notes toward the money dispensing mechanism 82. In the box 84, its one end confronting with the money dispensing mechanism is provided with a money outlet 88 through which bank notes are transferred one by one through the money dispensing mechanism 82 to the tray 83.

The box 84 is further provided with a window 89 elongated in a longitudinal direction on the bottom, in which a near-end detector 810 comprising a reed switch is provided, while a permanent magnet 811 is secured under the plate 87. Accordingly, as the number of sheets of bank notes is reduced in the money container, the plate 87 approaches the detector 810. Upon arrival of the plate 87 at a position immediately above the detector 87, the latter produces a near-end detection signal NE representing the fact that the number of sheets of bank notes left in the money container 81 is very small.

The distance D between the detector 810 and the money outlet 88 is determined in advance so that the number of sheets of notes stacked in this distance D is a predetermined number of sheet of notes allowable in one money dispensing operation (hereinafter referred to as a maximum number of sheets of notes).

Figure 9:
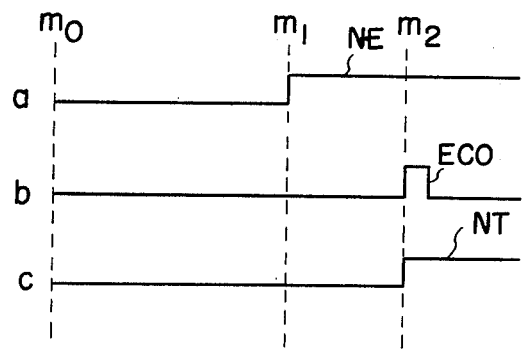
FIG. 9 is waveform diagrams illustrating various signals for operating the money container shown in FIG. 10.

Now, assume that a money dispensing command is applied to the money dispenser provided with the money container as described above to dispense more than the number of sheets of notes stacked between the detector 810 and the outlet 88, at the time instant $m_o$ (FIG. 9). As the money dispensing mechanism 82 dispenses notes in accordance with the command, the plate 87 advances in the direction of the arrow 812, approaching the detector 810. At the time instant $m_1$ when the plate 87 reaches the detector 810, the detector 810 produces the near-end detection signal NE and continues the production of the signal NE as is shown in FIG. 9.

When the detection signal NE has been produced, the number of sheets of the bank notes transferred out of the container is the number of sheets of notes between the plate 87 and the position of the detector 810, that is, the former number is smaller than the number of sheets of notes instructed to be transferred. Accordingly, the money dispensing operation is not suspended by the production of this detection signal NE. That is, the money dispensing mechanism continues to transfer bank notes 85 to the tray 83 even after the time instant $m_1$.

If the money dispenser is so designed that a coincidence signal ECO as shown in b, FIG. 9 is obtained at the time instant $m_2$ when the number of sheets of notes dropped into the tray 83 becomes equal to the number of sheets of bank notes instructed to be transferred out of the money container 81, on the basis of these signals NE and ECO a signal NT representing that there is no money in the container can be formed. This signal NT is employed for suspending the money dispensing operation of the money dispenser.

Thus, one money dispensing operation is correctly completed, transferring the number of sheets instructed to be transferred out of the money container 81 in the period of time of from the time instant $m_o$ to the time instant $m_2$. During this period of time, the signal NT operates to indicate the fact that there is no bank note in the money container and simultaneously to cause the money dispensing mechanism not to operate any longer.

As is apparent from the above description, the detector 810 is positioned so that the maximum number of sheets of bank notes are left in the money container 81, the detector 810 produces the nearend detection signal NE, thereafter the coincidence signal ECO is attained when the number of sheets of bank notes transferred into the tray 83 coincides with the number of sheets of bank notes instructed to be dispensed, and the money dispensing operation is suspended on the basis of these two signals NE and ECO. Accordingly, once a money dispensing operation starts in accordance with a money dispensing command issued to the money dispenser, the money dispensing operation is not interrupted until it is completed, that is, the money dispensing operation dispenses the number of sheets instructed by the money dispensing command; however, the signal NT causes the money dispenser not to dispense bank notes thereafter. Therefore, it is not necessary for a person to attend the money dispenser at all times, which contributes to labor saving.

in the above description, the coincidence signal ECO is directly employed as a means for stopping the money dispensing operation; however, the money dispensing mechanism may be so designed that, when the signal ECO is obtained, the operating conditions of the money dispenser are confirmed to determine whether or not any trouble is caused therein and then the money dispensing operation is stopped.

The detector 810 is not limited to that described above, and may be replaced by optical, electrical or mechanical detector.

We claim:

1. An automatic money dispenser adapted to be utilized in combination with a central processing unit, which comprises:

a transfer-flag circuit means operatively coupled to said central processing unit for forming a transfer-flag signal rerspousive to a data transmission starting signal and a data transmission ending signal which are applied to said automatic money dispenser respectively before and after money dispensing data arrives from said central processing unit;

a memory register operatively coupled for storing said money dispensing data based on said transfer-flag signal provided by said transfer-flag circuit means;

a strobe circuit means operatively coupled to said transfer-flag circuit means and to said central processing unit for receiving said transfer-flag signal and data pulses applied in synchronization with said money dispensing data to produce strobe signals at predetermined times based on the data shift pulses;

a memory check circuit means operatively coupled for discriminating, on the basis of said money dispensing data and said strobe signals, digits of said money dispensing data stored in said memory register, to detect monetary denominations necessary for the dispensation of a designated amount of money;

a money container setting means operatively coupled to said memory check circuit means and to a group of money containers which respectively contain money of different denominations for moving a selected one of said group of money containers to a money transferring position, said selected money container corresponding to the monetary denomination thus detected;

a money transferring means located adjacent said money container positioned at the money transferring position and to a money dispensing outlet;

a money counting circuit means operatively coupled for counting the amount of money transferred to the money dispensing outlet from said money container by said money transferring means;

and a comparison circuit means operatively coupled to said money counting circuit means and said memory register for comparing contents of said memory register with the contents of said money counting circuit means and producing an output indicative of coincidence, the money dispensing operation being thereby continuously carried out until the contents of said money counting circuit means coincides with the contents of said memory register, and the amount of money designated being automatically dispensed in accordance with command signals from the central processing unit.

2. An automatic money dispenser as claimed in claim 1, which further comprises a parity check circuit means operatively coupled for performing a parity check on the data introduced to said memory register with the aid of said strobe signals produced by said strobe circuit means, whereby whenever said strobe signal is obtained, a monetary denomination detecting operation and a parity check operation are simultaneously carried out by said memory check circuit means and said parity check circuit means, respectively, with respect to a digit corresponding to the strobe signal.

3. An automatic money dispenser as claimed in claim 2, further comprising detecting means operatively associated with said group of money containers for detecting when tha number of pieces of money remaining in said selected money container are below a predetermined value, said predetermined value being at least as large as the maximum number of pieces of money which can be dispensed at any one request, said detecting means producing an output indicative thereof, and comparison means coupled to said detecting means and said comparison circuit means for suspending operation of the automatic money dispenser in response to the simultaneous occurence of output from said comparison circuit means and said detecting means, whereby said money container may be resupplied so that a user will always receive the entire amount of money requested in one operation.

4. An automatic money dispenser as claimed in claim 3, further comprising manual operating switches operatively coupled for producing manual money dispensing signals corresponding to associated ones of said group of money containers, and lock circuit means operatively coupled to said manual operating switches for suppressing signals generated by said switches during an auotmatic dispensing operation.

5. A method for ensuring that a user of an automatic money dispenser associated with a central processing unit will have his request completely fulfilled in one operation of said automatic money dispenser, comprising the steps of;

generating a coincidence signal when the amount of money dispensed coincides with an amount of money designated to be dispensed;

producing a detection signal when the number of pieces of money remaining in a money container of said automatic dispenser reaches a valve chosen to be at least as large as the maximum number of pieces of money which can be dispensed from said money container at any one request;

generating a warning signal upon the simultaneous occurance of said detection signal and said coincidence signal, said warning signal indicating that money left in the money container is insufficient for a next money dispensing request; and suspending operation of said automatic money dispenser in response to said warning signal until said money container is resupplied, whereby a user will always receive all of the money requested in one operation.

* * * * *